United States Patent
Gollapalli et al.

(10) Patent No.: US 9,428,021 B2
(45) Date of Patent: Aug. 30, 2016

(54) JOUNCE BUMPER

(71) Applicant: BASF SE, Ludwigshafen (DE)

(72) Inventors: Ashish M. Gollapalli, Sterling Heights, MI (US); Sadiq Al-Dahhan, Dearborn, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/433,190

(22) PCT Filed: Oct. 2, 2013

(86) PCT No.: PCT/US2013/062976
§ 371 (c)(1),
(2) Date: Apr. 2, 2015

(87) PCT Pub. No.: WO2014/055596
PCT Pub. Date: Apr. 10, 2014

(65) Prior Publication Data
US 2015/0258870 A1    Sep. 17, 2015

Related U.S. Application Data (60) Provisional application No. 61/708,732, filed on Oct. 2, 2012.

(51) Int. Cl.
*B60G 11/22* (2006.01)
*B60G 13/00* (2006.01)
*F16F 9/58* (2006.01)

(52) U.S. Cl.
CPC ............. *B60G 11/22* (2013.01); *B60G 13/005* (2013.01); *F16F 9/58* (2013.01); *B60G 2202/143* (2013.01); *B60G 2204/4502* (2013.01)

(58) Field of Classification Search
CPC .. B60G 11/22; B60G 13/003; B60G 13/005; B60G 2202/143; B60G 2204/4502; B60G 2204/45021; F16F 9/58
See application file for complete search history.

(56) References Cited

U.S. PATENT DOCUMENTS 5,201,500 A * 4/1993 Ecktman .................. B60G 7/04
267/136
5,257,730 A * 11/1993 Nakaura ................. F16F 3/093
267/140.3

(Continued)

FOREIGN PATENT DOCUMENTS

CN     101837717 A    9/2010
JP     S 61-077505 A    4/1986

OTHER PUBLICATIONS

International Search Report for Application No. PCT/US2013/062976 dated Jan. 16, 2014, 3 pages.

(Continued)

*Primary Examiner* — Laura Freedman
(74) *Attorney, Agent, or Firm* — Howard & Howard Attorneys PLLC (57) ABSTRACT

A jounce bumper is used in a suspension system of a vehicle. The jounce bumper comprises an outer member comprising a base portion and a sidewall extending from said base portion. The sidewall of the outer member is flexible relative to the base portion. The base portion and the sidewall define a cavity such that the outer member has a cup-shaped configuration. A bumper is at least partially seated within the cavity of the outer member. The bumper is compressible into the cavity of the outer member such that the bumper expands against the sidewall of the outer member, which forces the sidewall of the outer member to flex and expand radially outward. An isolation layer is disposed on the base of the outer member outside of the cavity and separates the outer member from either the strut assembly or the frame member.

19 Claims, 5 Drawing Sheets

(56) References Cited

U.S. PATENT DOCUMENTS

| | | | | |
|---|---|---|---|---|
| 5,308,104 | A * | 5/1994 | Charles | B60G 11/52 |
| | | | | 267/220 |
| 5,456,454 | A * | 10/1995 | Schulz | B60G 13/003 |
| | | | | 188/321.11 |
| 5,975,505 | A | 11/1999 | Yoshimoto et al. | |
| 6,296,237 | B1 * | 10/2001 | Nagai | B60G 7/04 |
| | | | | 267/140 |
| 7,048,265 | B2 * | 5/2006 | Huprikar | F16F 3/0873 |
| | | | | 267/141.1 |
| 7,070,157 | B2 * | 7/2006 | Huprikar | F16F 1/37 |
| | | | | 248/560 |
| 7,338,040 | B2 * | 3/2008 | Schleck | F16F 9/58 |
| | | | | 267/220 |
| 7,416,175 | B2 * | 8/2008 | Al-Dahhan | B60G 11/15 |
| | | | | 267/140 |
| 8,123,203 | B2 | 2/2012 | Patil et al. | |
| 2005/0012256 | A1 | 1/2005 | Huprikar et al. | |
| 2005/0230891 | A1 | 10/2005 | Griffin | |
| 2006/0272911 | A1 | 12/2006 | Feldmann | |
| 2010/0127437 | A1 * | 5/2010 | Stevens | F16F 9/58 |
| | | | | 267/64.11 |
| 2015/0239315 | A1 * | 8/2015 | Al-Dahhan | F16F 1/377 |
| | | | | 280/124.177 |

OTHER PUBLICATIONS

English language abstract for CN 101837717 extracted from espacenet.com database on Jul. 10, 2016, 2 pages.

* cited by examiner

JOUNCE BUMPER

CROSS-REFERENCE TO RELATED APPLICATIONS

This application is the National Stage of International Patent Application No. PCT/US2013/062976, filed on Oct. 2, 2013, which claims priority to and all advantages of U.S. Provisional Patent Application No. 61/708,732, which was filed on Oct. 2, 2012, the disclosure of which is specifically incorporated by reference.

FIELD OF THE INVENTION

The present invention generally relates to a jounce bumper for use in a suspension system of a vehicle.

BACKGROUND OF THE INVENTION

Jounce bumpers are used in a suspension system of a vehicle to limit transmission of an impact force to a frame member of the vehicle. For example, when the vehicle travels over a bump, components of the suspension system, such as a strut assembly, jounce or collapse to absorb the impact force generated by the bump. However, when the suspension system cannot completely absorb the impact force, the components of the suspension system may impact the frame assembly thereby transmitting the impact force to the frame member, which is not desirable.

Generally, the jounce bumpers gradually stiffen the suspension systems as the suspension system approaches an end of its jounce travel, i.e., before the components of the suspension system impact the frame of the vehicle. As such, a conventional jounce bumper is used to separate components of the suspension system and the frame member of the vehicle to prevent the suspension system from directly impacting the frame member. For example, the conventional jounce bumper may be coupled to a piston rod of a strut assembly of the suspension system between a cylinder of the strut assembly and the frame of the vehicle. The conventional jounce bumper separates the cylinder of the strut assembly and the frame member of the vehicle to prevent the cylinder from directly impacting the frame member as the strut assembly approaches the end of its jounce travel.

The conventional jounce bumper includes a rigid cup and disk-shaped bumper disposed within a cavity of the rigid cup. Generally, the rigid cup couples the disk-shaped bumper to the vehicle or the strut and limits compression of the disk-shaped bumper, thereby increasing a stiffness of the jounce bumper. As the disk-shaped bumper is compressed, the resistance to compression increases to the point the disk-shaped bumper acts like a solid. The compression of the disk-shaped bumper absorbs energy transferred from the suspension system. However, once the disk-shaped bumper acts like a solid, any remaining energy in the suspension system is transferred directly to the frame member of the vehicle. The rigid cup limits the bulging of the bumper, thereby limiting the energy absorbed by the disk-shaped bumper before the disk-shaped bumper acts like a solid. Therefore, there remains a need to provide an improved jounce bumper.

SUMMARY OF THE INVENTION AND ADVANTAGES

A jounce bumper is used in a suspension system of a vehicle. The vehicle includes a frame member and the suspension system includes a strut assembly moveable relative to the frame member. The jounce bumper comprises an outer member capable of being disposed between the frame member and the strut assembly. The outer member has a base portion and a sidewall extending from said base portion. The sidewall of the outer member is flexible relative to the base portion. The base portion and the sidewall define a cavity such that the outer member has a cup-shaped configuration. A bumper is at least partially seated within the cavity of the outer member. The bumper is compressible into the cavity of the outer member such that the bumper expands against the sidewall of the outer member. The expansion of the bumper forces the sidewall of the outer member to flex and expand radially outward.

The jounce bumper also comprises an isolation layer disposed on the base of the outer member outside of the cavity. The isolation layer separates the outer member and either the strut assembly or the frame member such that the outer member is isolated from either the strut assembly or the frame member as the sidewall of the outer member expands radially outward. Separating the outer member from either the strut assembly or the frame member minimizes noise produced as the bumper is compressed and the sidewall expands radially outward.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like or corresponding parts throughout the several views, a jounce bumper is generally shown at 20. Generally, the jounce bumper 20 is used with a suspension system 22 of a vehicle to limit transmission of an impact force to a frame member 24 of the vehicle. More specifically, the jounce bumper 20 is disposed between components of the suspension system 22, such as a strut assembly 26, and the frame member 24 to separate the components of the suspension system 22 and the frame member 24. By separating the components of the suspension system 22 and the frame member 24, the jounce bumper 20 prevents the components of the suspension system 22 from directly impacting the frame member 24 as the suspension system 22 absorbs the impact force, which is generated by the vehicle traveling over a bump. Said differently, the jounce bumper 20 provides a cushion between components of the suspension system 22 and the frame member 24 by gradually stiffening the suspension system 22 as the suspension system 22 approaches an end 32 of its maximum jounce travel, i.e., before components of the suspension system 22 contact the frame member 24 of the vehicle.

Figure 1:
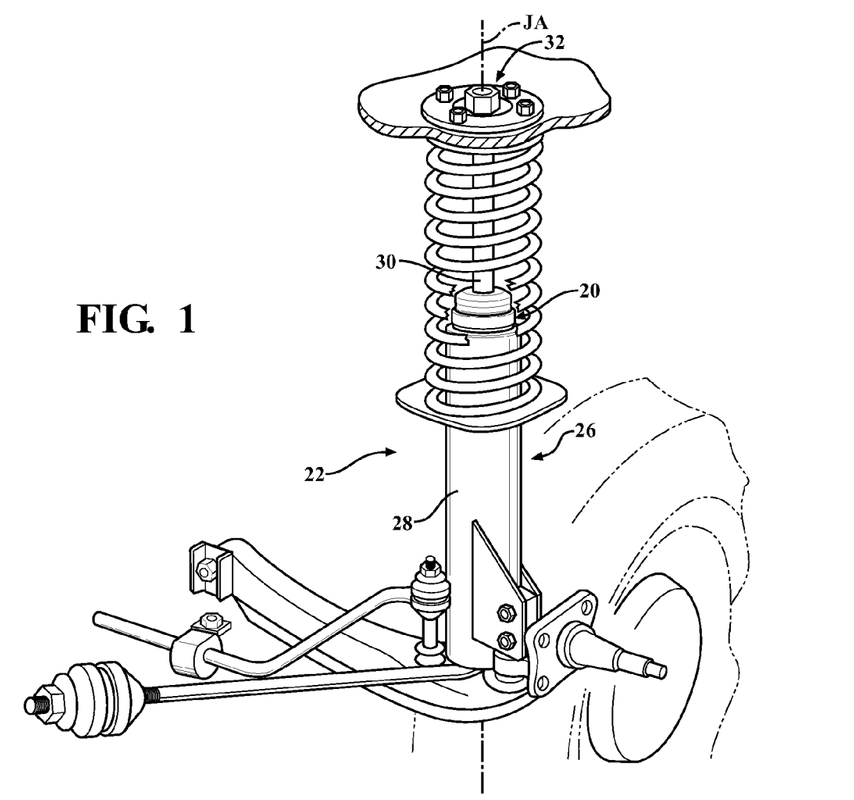
FIG. 1 is a perspective view of a suspension system of a vehicle including a jounce bumper.

As alluded to above, the suspension system 22 includes a strut assembly 26 as part of the suspension system 22. With reference to FIG. 1, the strut assembly 26 comprises a cylinder 28 and a piston arm 30 displaceable relative to the cylinder 28 along a jounce axis JA. An end 32 of the piston arm 30 is coupled to the frame member 24 for coupling the suspension system 22 to the frame member 24 of the vehicle.

Figure 2:
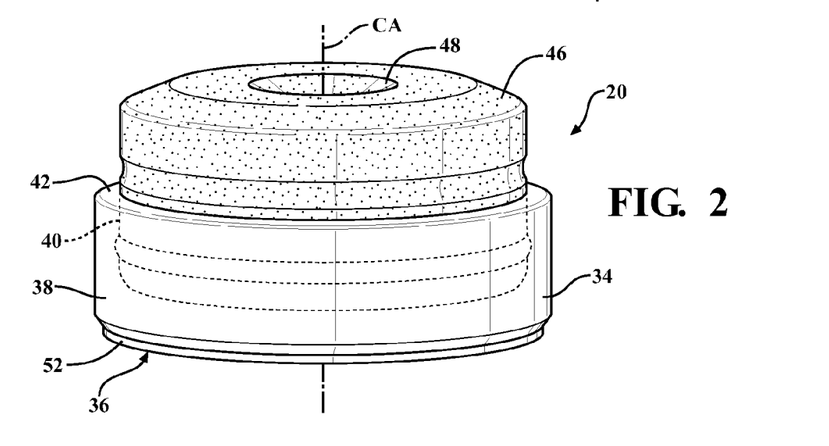
FIG. 2 is a perspective view of the jounce bumper having an outer member and a bumper.

With reference to FIG. 2, the jounce bumper 20 comprises an outer member 34 capable of being disposed between the frame member 24 and the strut assembly 26. Generally, the jounce bumper 20 is in alignment with the jounce axis JA of the strut assembly 26 to ensure the strut assembly 26 contacts the jounce bumper 20 as the piston arm 30 collapses into the cylinder 28 to allow the jounce bumper 20 to absorb the impact force. Typically, the outer member 34 is disposed between the cylinder 28 of the strut assembly 26 and the frame member 24. Generally, the outer member 34 allows the jounce bumper 20 to be coupled to the vehicle. For example, the outer member 34 may be connected to the strut assembly 26, and, more specifically, to the cylinder 28 of the strut assembly 26 for connecting the jounce bumper 20 to the strut assembly 26. Because the strut assembly 26 is coupled to the frame member 24, connecting the jounce bumper 20 to the cylinder 28 of the strut assembly 26 also connects the jounce bumper 20 to the vehicle. However, it is to be appreciated that the outer member 34 may be connected to the fame member for connecting the jounce bumper 20 to the vehicle.

The outer member 34 has a base portion 36 and a sidewall 38 extending from the base portion 36. Generally, the base portion 36 has a perimeter presenting a circular configuration with the base portion 36 defining a center point. A central axis CA extends longitudinally through the center point of the base portion 36. The sidewall 38 has an arcuate configuration and is coupled to the base portion 36 along the perimeter of the base portion 36. The sidewall 38 extends in a parallel direction with the central axis CA. As such, the sidewall 38 has a cylindrical configuration. Furthermore, the base portion 36 and the sidewall 38 define a cavity 40 such that the outer member 34 has a cup-shaped configuration. Said differently, the base portion 36 and the sidewall 38 define a U-shaped configuration in cross-section. Typically, the base portion 36 and the sidewall 38 are integral to one another. Said differently the base portion 36 and the sidewall 38 are typically formed at the same time. However, it is to be appreciated that the base portion 36 and the sidewall 38 may be separate components relative to one another.

Figure 4:
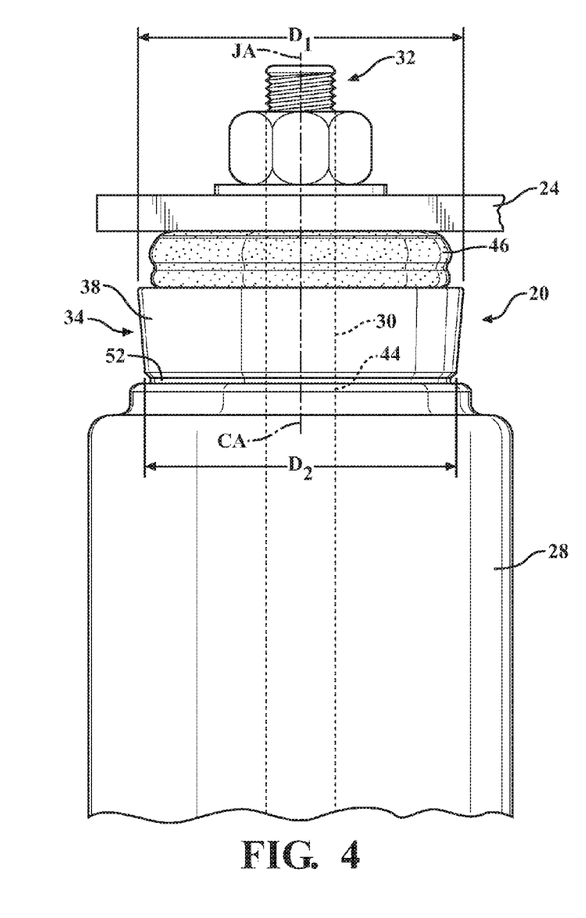
FIG. 4 is profile view of the jounce bumper coupled to the cylinder of the strut assembly with the jounce bumper compressed between the cylinder and a frame of the vehicle.

The sidewall 38 terminates at an edge 42, which is spaced from the base portion 36. The sidewall 38 is flexible relative to the base portion 36, as best shown in FIG. 4. Said differently, the sidewall 38 may pivot about a point where the sidewall 38 meets the base portion 36 with the edge 42 of the sidewall 38 moving radially outward relative to the central axis CA of the outer member 34. Said yet another way, when the sidewall 38 flexes radially outward, a diameter d1 defined by the edge 42 of the sidewall 38 is greater than a diameter d2 defined by the base portion 36. The outer member 34, and, more specifically, the sidewall 38 of the outer member 34, comprises a thermoplastic material for allowing the sidewall 38 to flex radially outward. Typically, the thermoplastic material is selected from the group of thermoplastic elastomers and thermoset elastomers such as urethanes or rubbers. An example of suitable thermoplastic materials for the outer member 34 is Elastollan® available from BASF Corporation.

A bumper 46 is at least partially seated within the cavity 40 of the outer member 34. Said differently, at least a portion of the bumper 46 is disposed within the cavity 40. However, it is to be appreciated that the bumper 46 may be complete disposed within the cavity 40 such that the bumper 46 is not visible when a profile of the jounce bumper 20 is viewed. The bumper 46 has an arcuate configuration complementary to the arcuate configuration of the sidewall 38 of the outer member 34 such that the bumper 46 contacts the sidewall 38 within the cavity 40. It is to be appreciated that the bumper 46 may be held within the outer member 34 by any suitable methods. For example, an adhesive may be applied to the base portion 36 within the cavity 40 for bonding the bumper 46 to the outer member 34. Alternatively, the base portion 36 may define a groove and the bumper 46 may have a flange about its perimeter for engaging the groove to form a groove lock.

Figure 3:
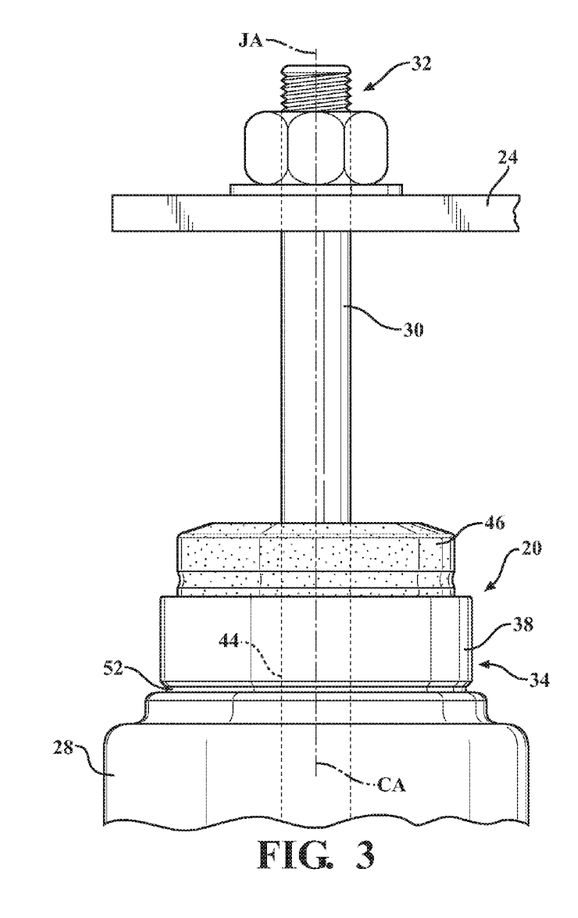
FIG. 3 is profile view of the jounce bumper coupled to a cylinder of a strut assembly.
Figure 5:
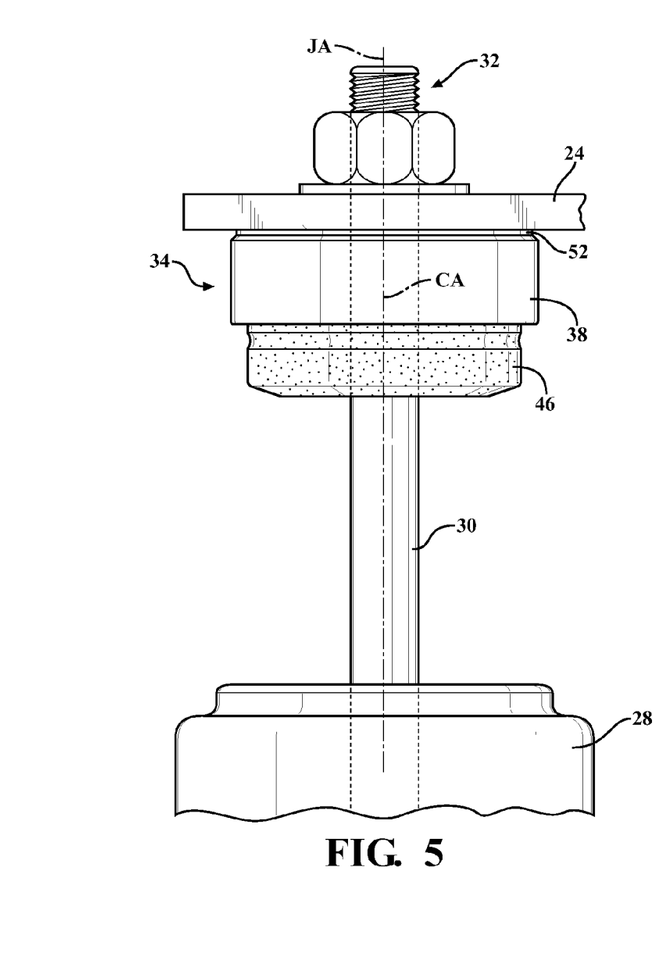
FIG. 5 is profile view of the jounce bumper coupled to the frame of the vehicle.
Figure 6:
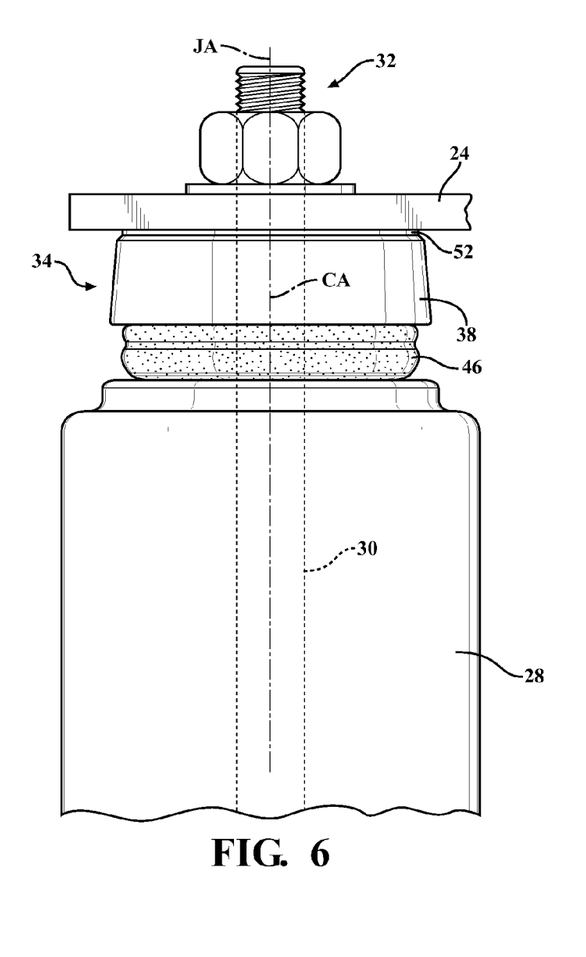
FIG. 6 is profile view of the jounce bumper coupled to the frame of the vehicle with the jounce bumper compressed between the frame and the cylinder of the strut assembly.

With reference to FIGS. 3-6, when the jounce bumper 20 can be coupled to the strut assembly 26. The base portion 36 of the outer member 34 defines a hole 44 (best shown in FIGS. 10 and 11) centered about the center point of the base portion 36 for receiving the piston arm 30 of the strut assembly 26. In such an embodiment, the outer member 34, and therefore the jounce bumper 20, is disposed between the cylinder 28 of the strut assembly 26 and the frame member 24. Additionally, the central axis CA of the outer member 34 is aligned with the jounce axis JA of the strut assembly 26. Furthermore, when the jounce bumper 20 is coupled to the strut assembly 26, the bumper 46 defines a bore 48 for receiving the piston arm 30 of the strut assembly 26. The bore 48 is aligned with the hole 44 of the outer member 34 and the jounce axis JA such that the bumper 46 is disposed between the outer member 34 and the cylinder 28 of the strut assembly 26. Therefore, the cylinder 28 of the strut assembly 26 will contact the jounce bumper 20 as the piston arm 30 collapses into the cylinder 28, thereby absorbing the impact force. It is to be appreciated that the jounce bumper 20 may be coupled to the cylinder 28 such that the jounce bumper 20 moves with the cylinder 28 as shown in FIGS. 3 and 4. Alternatively, the jounce bumper 20 may be coupled to the frame member 24 such that the jounce bumper 20 remains stationary and the cylinder 28 moves into contact with the jounce bumper 20, as shown in FIGS. 5 and 6.

The bumper 46 is compressible into the cavity 40 of the outer member 34. Generally, the bumper 46 is compressed by the components of the suspension system 22 as the suspension system 22 approaches the end 32 of its maximum jounce travel to absorb the impact force. For example, as the piston arm 30 collapses into the cylinder 28 of the strut assembly 26, the cylinder 28 will contact the jounce bumper 20 and compress the bumper 46 instead of impacting the frame member 24 directly. Therefore, the bumper 46 comprises a material that is resilient, i.e., material that is able to spring back to shape after being compressed. For example, the material of the bumper 46 may be microcellular urethane. The compression of the bumper 46 provides additional absorption of the impact force before the impact force is transmitted to the frame member 24.

As introduced above, when the vehicle travels over a bump, the impact force is generated. If the impact force is greater than the suspension system 22 can absorb, the components of the suspension system 22, such as the strut assembly 26 compress the bumper 46. The greater the impact force, the greater the compression of the bumper 46. An amount of the impact force absorbed by the bumper 46 is dependent on a maximum compression of the bumper 46. However, the maximum compression of the bumper 46 is controlled by the outer member 34. For example, as the bumper 46 is compressed, the bumper 46 expands radially into the sidewall 38 of the outer member 34. The outer member 34 initially resist further compression of the bumper 46 until the sidewall 38 of the outer member 34 flexes and also expands radially outward. By allowing the sidewall 38 to flex, the maximum compression of the bumper 46 is increased, as compared to prior art jounce bumpers with a rigid outer member. The flexing of the sidewall 38 of the outer member 34 allows the bumper 46, and therefore the jounce bumper 20, to absorb more of the impact force.

In operation, the components of the suspension system 22 receive the impact force and jounce along the jounce axis JA to absorb the impact force. If the impact force is greater than the suspension system 22 can absorb, the components of the suspension system 22 begin to compress the bumper 46 of the jounce bumper 20. For example, when the jounce bumper 20 is coupled to the cylinder 28 of the strut assembly 26, the piston arm 30 collapses into the cylinder 28 against resistance to absorb the impact force. As the piston arm 30 collapses, the cylinder 28 moves along the jounce axis JA toward the frame member 24 such that the bumper 46 contacts the frame member 24. As the cylinder 28 continues along the jounce axis JA, the bumper 46 is compressed. As the bumper 46 is compressed, it collapses into the cavity 40 of the outer member 34. As the bumper 46 is compressed into the cavity 40 of the outer member 34, the sidewall 38 of the outer member 34 begins to flex radially outward. A portion of the impact force is required to compress the bumper 46 and to flexing the sidewall 38 of the outer member 34, thereby reducing or possibly eliminating the transmission of the impact force to the frame member 24. Unlike prior art jounce bumpers with a rigid outer member that does not flex, the flexing of the sidewall 38 also results in additional absorption of the impact force thereby increasing an energy absorption potential of the jounce bumper 20 as compared to prior art jounce bumpers. Therefore, both the bumper 46 and the outer member 34 react to the impact force applied on the jounce bumper 20 for absorbing the impact force.

Figure 7:
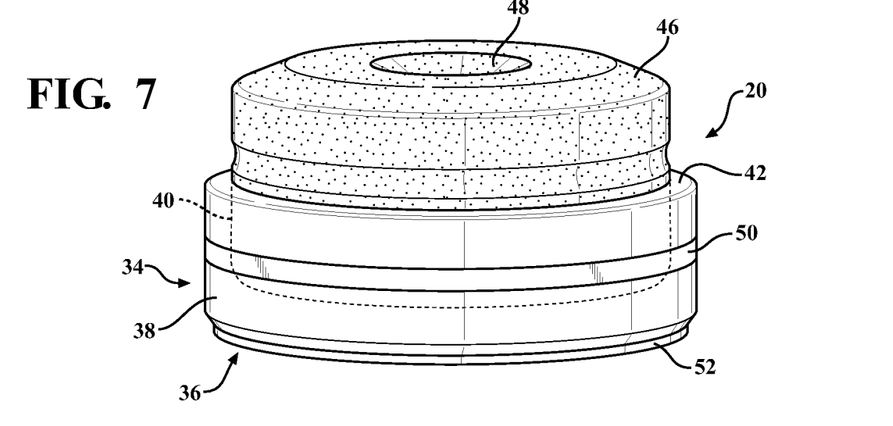
FIG. 7 is a perspective view of the jounce bumper with a reinforcing element disposed about the outer member of the jounce bumper.
Figure 8:
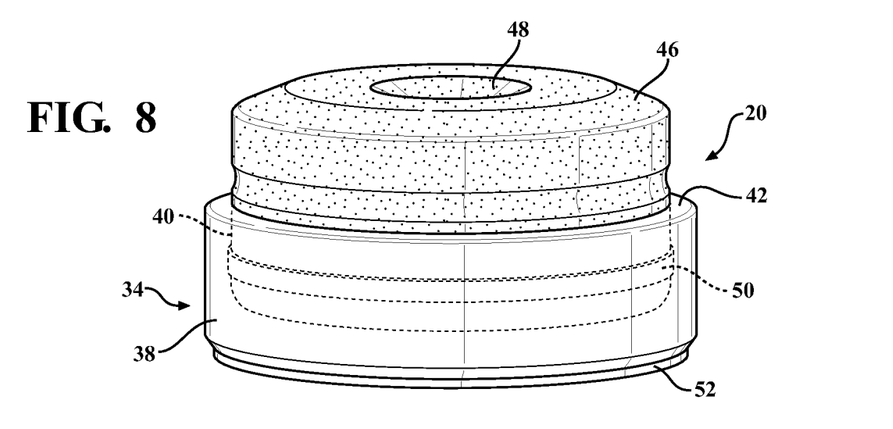
FIG. 8 is a perspective view of the jounce bumper with the reinforcing element embedded within the outer member of the jounce bumper.
Figure 9:
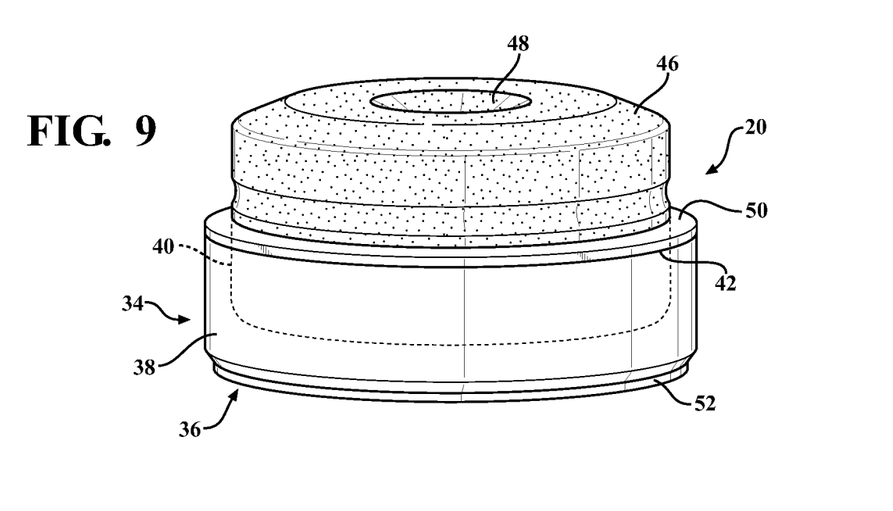
FIG. 9 is a perspective view of the jounce bumper with the reinforcing element disposed about an edge of the outer member.

With reference to FIGS. 7-9, the jounce bumper 20 may include a reinforcing element 50 contacting the sidewall 38 of the outer member 34 for controlling radial expansion of the sidewall 38. Said differently, the reinforcing element 50 is designed to limit the radial expansion of the sidewall 38 of the outer member 34 after the sidewall 38 flexes a predetermined amount. As such, once the reinforcing element 50 limits the radial expansion of the sidewall 38, the outer member 34 acts like a rigid material and restricts further compression of the bumper 46. Limiting the radial expansion of the side wall 38 prevents the sidewall from expanding beyond an elastic limit, which can result in failure of the jounce bumper 20. The reinforcing element also controls the energy/stain characteristics of the jounce bumper 20. For example, moving the reinforcing element 50 along the sidewall 38 changes an amount of the outer member 34 that undergoes strain to dissipate energy. However, once the jounce bumper 20 is fully compressed, any remaining impact force is transmitted to the frame member 24.

The reinforcing element 50 may have a ring-shaped configuration. The ring-shaped reinforcing element 50 may be disposed about the sidewall 38 of the outer member 34, outside the cavity 40, as shown in FIG. 7. Alternatively, the ring-shaped reinforcing element 50 may be embedded within the sidewall 38 of the outer member 34, as shown in FIG. 8. Furthermore, the ring-shaped reinforcing element 50 may be disposed on the edge 42 of the sidewall 38, as shown in FIG. 9.

Figure 10:
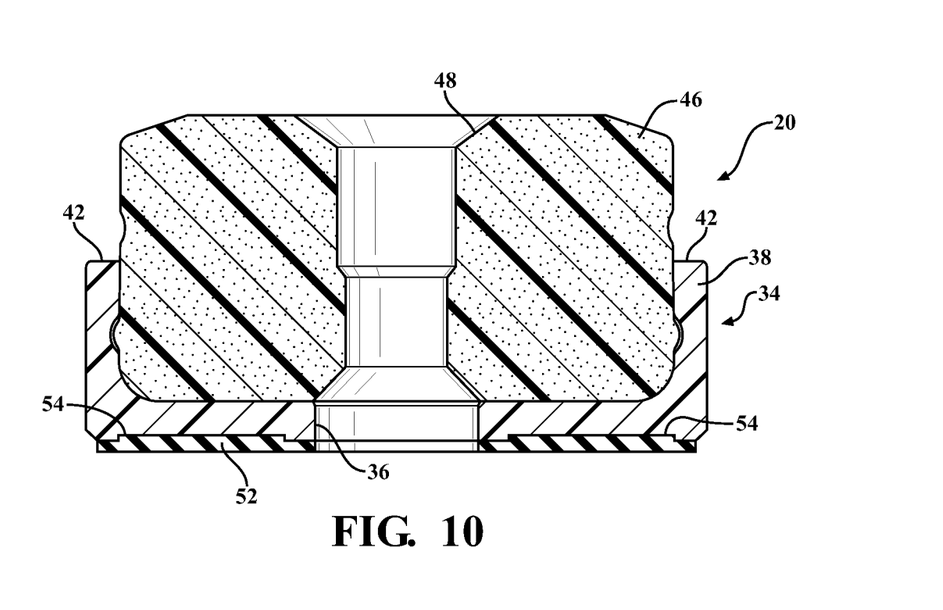
FIG. 10 is a cross-sectional view of the jounce bumper with the jounce bumper including an isolation layer.
Figure 11:
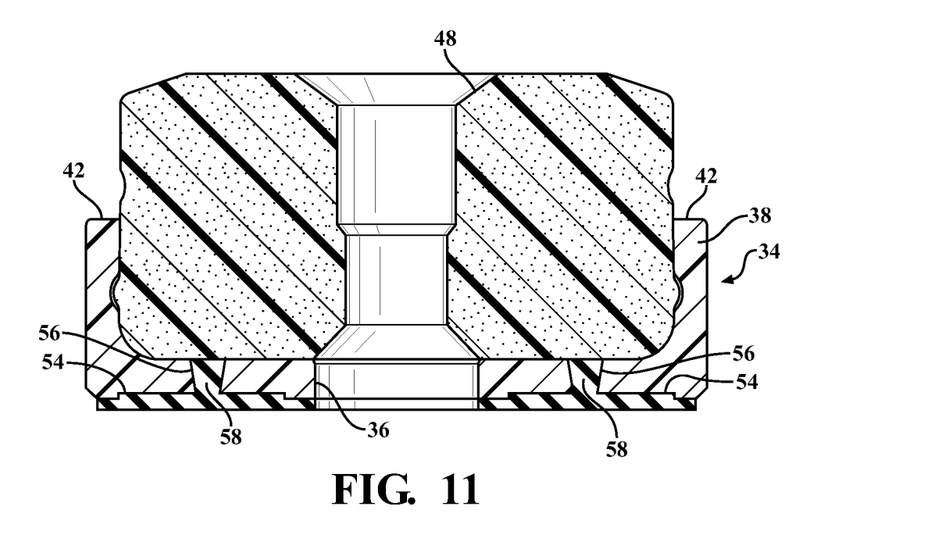
FIG. 11 is a cross-sectional view of the jounce bumper with the jounce bumper defining a plurality of anchoring holes for receiving bosses of the isolation layer to couple the isolation layer to the outer member of the jounce bumper.

As the sidewall 38 of the outer member 34 flexes and expands outward, the outer member 34 may rub against either components of the suspension system 22 or the frame member 24, depending on where the jounce bumper 20 is disposed on the vehicle. There is potential for noise generation by the rubbing of the outer member 34 against the components of the suspension system 22 or the frame member 24. Additionally, noise can be generated by the outer member 34 impacting the suspension system 22. Therefore, as shown in as 10 and 11, the jounce bumper 20 also includes an isolation layer 52 disposed on the base portion 36 of the outer member 34 outside of the cavity 40 for separating the outer member 34 and components of the suspension system 22 or the frame member 24. For example, the isolation layer 52 of the jounce bumper 20 may separate the outer member 34 from the strut assembly 26, and, more specifically, the cylinder 28 of the strut assembly 26. Alternatively, the isolation layer 52 of the jounce bumper 20 may separate the outer member 34 from the frame member 24. Isolating the outer member 34 from either the strut assembly 26 or the frame member 24 prevents the generation of noise as the bumper 46 is compressed and the sidewall 38 of the outer member 34 expands radially outward.

The isolation layer 52 of the jounce bumper 20 may comprise a material selected from the group of rubber, EPDM, Santoperene, TPU, and combinations therefore. Typically, the isolation layer 52 of the jounce bumper 20 is rubber. More typically, the isolation layer 52 of the jounce bumper 20 is low hardness TPU.

The base portion 36 of the outer member 34 may define a plurality of grooves 54 for receiving the isolation layer 52 to secure the isolation layer 52 to the outer member 34. The grooves 54 provide additional surface area for the isolation layer 52 to bond to the outer member 34. The isolation layer 52 may be coupled to the outer member 34 by any suitable method. For example, the isolation layer 52 may be coupled to the outer member 34 by over-molding. As shown in FIG. 11, the base portion 36 of the outer member 34 may define a plurality of anchoring holes 56 in communication with the cavity 40 of the outer member 34. The isolation layer 52 may have a plurality of bosses 58 for inserting into the anchoring holes 56 to secure the isolation layer 52 to the outer member 34.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention may only be determined by studying the following claims.

What is claimed is:

1. A jounce bumper assembly for a suspension system of a vehicle with the vehicle including a frame member and the suspension system including a strut assembly moveable relative to the frame member, said jounce bumper assembly comprising:
   an outer member capable of being disposed between the frame member and the strut assembly with said outer member having a base portion and a sidewall extending from said base portion with said sidewall flexible relative to said base portion and with said base portion and said sidewall defining a cavity such that said outer member has a cup-shaped configuration;
   a bumper at least partially seated within said cavity of said outer member with said bumper compressible into said cavity of said outer member such that said bumper expands radially against said sidewall of said outer member thereby forcing said sidewall to flex and expand radially outward; and
   an isolation layer disposed on said base portion of said outer member outside of said cavity for separating said outer member and either the strut assembly or the frame member such that said outer member is isolated from either the strut assembly or the frame member as said sidewall of said outer member expands radially outward thereby minimizing noise produced as said bumper is compressed and said sidewall expands radially outward.

2. A jounce bumper assembly as set forth in claim 1 wherein said isolation layer comprises a material selected from the group of rubber, EPDM, Santoperene, TPU, and combinations therefore.

3. A jounce bumper assembly as set forth in claim 2 wherein said bumper comprises a microcellular urethane.

4. A jounce bumper assembly as set forth in claim 3 wherein said outer member comprises a thermoplastic material.

5. A jounce bumper assembly as set forth in claim 1 wherein said outer member defines a plurality of anchoring holes in communication with said cavity of said outer member and said isolation layer has a plurality of bosses for inserting into said anchoring holes to secure said isolation layer to said outer member.

6. A jounce bumper assembly as set forth in claim 1 further comprising a reinforcing element contacting said sidewall of said outer member for controlling radial expansion of said sidewall.

7. A jounce bumper assembly as set forth in claim 1 wherein said bumper is completely disposed within said cavity of said outer member.

8. A jounce bumper assembly as set forth in claim 1 wherein said sidewall of said outer member has an arcuate configuration and said bumper has an arcuate configuration complementary to said arcuate configuration of said outer member such that said bumper contact said sidewall within said cavity.

9. A vehicle comprising,
   a frame member;
   a suspension system including a strut assembly coupled to said frame member with said strut assembly moveable relative to said frame member; and
   a jounce bumper assembly comprising;
      an outer member capable of being disposed between the frame member and the strut assembly with said outer member having a base portion and a sidewall extending from said base portion with said side wall flexible relative to said base portion and with said base portion and said sidewall defining a cavity such that said outer member has a cup-shaped configuration;
      a bumper at least partially seated within said cavity of said outer member with said bumper compressible into said cavity of said outer member such that said bumper expands against said sidewall of said outer member thereby forcing said sidewall to flex and expand radially outward; and
      an isolation layer disposed on said base portion of said outer member outside of said cavity for separating said outer member and either the strut assembly or the frame member such that said outer member is isolated from either the strut assembly or the frame member as said sidewall of said outer member expands radially outward thereby minimizing noise produced as said bumper is compressed and said sidewall expands radially outward.

10. A vehicle as set forth in claim 9 wherein said strut assembly has a cylinder and a piston arm coupled to said frame member and displaceable relative to said cylinder along a jounce axis.

11. A vehicle as set forth in claim 10 wherein said base portion of said outer member defines a hole for receiving said piston arm such that said outer member is disposed between said cylinder and said frame member along said jounce axis.

12. A vehicle as set forth in claim 11 wherein said bumper defines a bore for receiving said piston arm such that said bumper is disposed between said outer member and either of said frame member or said cylinder.

13. A vehicle as set forth in claim 9 wherein said isolation layer comprises a material selected from the group of rubber, EPDM, Santoperene, TPU, and combinations therefore.

14. A vehicle as set forth in claim 13 wherein said bumper comprises a microcellular urethane.

15. A vehicle as set forth in claim 14 wherein said outer member comprising a thermoplastic material.

16. A vehicle as set forth in claim 9 wherein said outer member of said jounce bumper assembly defines a plurality of anchoring holes in communication with said cavity of said outer member and said isolation layer has a plurality of bosses for inserting into said anchoring holes to secure said isolation layer to said outer member.

17. A vehicle as set forth in claim 9 wherein said jounce bumper assembly further comprises a reinforcing element contacting said sidewall of said outer member for controlling radial expansion of said sidewall.

18. A vehicle as set forth in claim 9 wherein said bumper is completely disposed within said cavity of said outer member.

19. A vehicle as set forth in claim 9 wherein said sidewall of said outer member has an arcuate configuration and said bumper has an arcuate configuration complementary to said arcuate configuration of said outer member such that said bumper contacts said sidewall within said cavity.

* * * * *